United States Patent [19]
Tanoue

[11] Patent Number: 5,844,898
[45] Date of Patent: Dec. 1, 1998

[54] METHOD OF RADIO CHANNEL SWITCHING OVER IN A MOBILE RADIO COMMUNICATIONS SYSTEM

[75] Inventor: Katsumi Tanoue, Tokyo, Japan

[73] Assignee: NEC Corporation, Tokyo, Japan

[21] Appl. No.: 645,213

[22] Filed: May 13, 1996

[30] Foreign Application Priority Data

May 16, 1995 [JP] Japan .................................. 7-117223

[51] Int. Cl.⁶ ............................. H04B 7/212; H04B 7/26; H04Q 7/24
[52] U.S. Cl. ........................ 370/332; 370/337; 455/436; 455/525
[58] Field of Search ..................................... 370/280, 331, 370/332, 337, 347; 455/422, 436, 437, 442, 443, 507, 517, 524, 525, 555, 560

[56] References Cited

U.S. PATENT DOCUMENTS

| | | | |
|---|---|---|---|
| 5,101,501 | 3/1992 | Gihousen et al. | 370/332 |
| 5,159,593 | 10/1992 | D'Amico et al. | 370/332 |
| 5,267,261 | 11/1993 | Blakeney, II et al. | 370/332 |
| 5,323,446 | 6/1994 | Kojima et al. | 455/436 |
| 5,329,635 | 7/1994 | Wadin et al. | 370/332 |
| 5,448,569 | 9/1995 | Huang et al. | 370/332 |
| 5,479,410 | 12/1995 | Paavonen | 370/332 |
| 5,483,668 | 1/1996 | Malkamaki et al. | 370/337 |

FOREIGN PATENT DOCUMENTS

| | | |
|---|---|---|
| 0 318 033 | 5/1989 | European Pat. Off. . |
| 0 439 630 | 8/1991 | European Pat. Off. . |
| 64-12628 | 1/1989 | Japan . |
| 1-321739 | 12/1989 | Japan . |
| 3-141729 | 6/1991 | Japan . |
| 4-323922 | 11/1992 | Japan . |
| 5-328428 | 12/1993 | Japan . |
| WO 94/29981 | 12/1994 | WIPO . |
| WO 96/05707 | 2/1996 | WIPO . |

Primary Examiner—Alpus H. Hsu
Attorney, Agent, or Firm—Young & Thompson

[57] ABSTRACT

A handover method for a mobile radio communications system, which reduces the disconnection time when the radio channel is switched from one radio base station to another radio base station. When the electric field received from a first radio base station weakens beyond a preset level during communication, the mobile station receives TDMA frames intermittently from other radio base stations without disconnecting communication with the first radio base station, and selects a second radio base station based on the strength of the received electric fields. In a similar manner, the mobile station then intermittently prepares for connection with the second radio base station while continuing the communication with the first radio base station.

2 Claims, 4 Drawing Sheets

BS: RADIO BASE STATION

METHOD OF RADIO CHANNEL SWITCHING OVER IN A MOBILE RADIO COMMUNICATIONS SYSTEM

BACKGROUND OF THE INVENTION

1. Field of the Invention

The present invention relates to a method of radio channel switching over in a mobile radio communications system, and more particularly, to a method of radio channel switching over for reducing a disconnection time of communication during communication between a mobile station and a radio base station in a mobile communications system utilizing a time division duplex communications system.

2. Description of the Related Art

In a conventional mobile communications system utilizing the time division duplex communications system, the system, which includes a plurality of radio base stations connected to a public switched telephone network (e.g., ISDN: Integrated Services Digital Network) and radio communication between a mobile station and one of the radio base stations, is known. With this system, the mobile station monitors the reception electric field from the communicating radio base station at all times during communication, and when the reception electric field becomes weaker than a predetermined level, it is assumed that further continuation of communication with the radio base station will become difficult, and thus a request is made for re-connection of radio channel to a radio base station which provides the strongest reception electric field among the nearby radio base stations, and the radio channel is switched to that radio base station.

In this case, selection of the radio base station to be switched to is accomplished by the method described in, for example, Japanese Unexamined Patent Application Disclosure HEI 1-321739, in which a vacant time slot of the time division multiplex access (TDMA) slot is used to monitor the reception electric fields of control channels which are transmitted from nearby base stations. In addition, it is designed so that after the radio base station to be switched to has been determined, communication with the radio base station currently used is disconnected, and re-connection of radio channel operations are performed for the switched radio base station.

Here, techniques relating to this are described in, for example, Japanese Unexamined Patent Application Disclosure SHO 64-12628, Japanese Unexamined Patent Application Disclosure HEI 3-141729, Japanese Unexamined Patent Application Disclosure HEI 4-323922, and Japanese Unexamined Patent Application Disclosure HEI 5-328428.

The prior art mentioned above has a problem in that communication is disconnected when the radio channel is being switched, since the procedure for re-connection of radio channel with the switched radio base station is followed. In addition, since a mobile station receives control channels from nearby radio base stations through a vacant time slot of the time division multiple access slot when the mobile station selects the radio base station to be switched to, a plurality of synthesizers or a fast switchable synthesizer must be provided internally for fast switching operation between received frequencies, and this prevents miniaturization of size and minimization of power consumption of mobile station.

SUMMARY OF THE INVENTION

Therefore, it is an object of the present invention to provide a method of radio channel switching over in a mobile radio communications system allowing reduction of the disconnected time of communication even if the radio channel is switched over from one radio base station to another during communication between a mobile station and a radio base station.

A method of radio channel switching over according to the present invention is applied in a mobile radio communications system including a plurality of radio base stations connected to a public switched telephone network, utilizing a time division duplex communications system between a mobile station and a radio base station.

The method comprises the following steps:

(1) monitoring reception of an electric field, at a mobile station, transmitted from a first radio base station which is currently communicating;

(2) judging whether a strength of the received electric field is weaker than a predetermined level for confirming effectiveness of communication between the mobile station and the first radio base station;

(3) receiving electric fields intermittently, at the mobile station, transmitted from other radio base stations during communication with the first radio base station, when the received electric field from the first radio base station becomes weaker than a predetermined level;

(4) selecting a second radio base station to be switched to ,from among the other radio base stations, which transmits the strongest electric field;

(5) executing channel re-connection operation intermittently with the second radio base station during communication with the first radio base station; and (6) terminating communication with the first radio base station and switching over the channel to the second radio base station when the channel re-connection operation with the second radio base station has been completed.

In the steps described above, the step of, receiving electric fields intermittently, at the mobile station, transmitted from other radio base stations during communication with the first radio base station, further comprises the following steps:

(1) using at least one frame of time division multiplex access frames for receiving electric fields from other radio base stations;

(2) using the rest of the frames of the time division multiplex access frames for communicating with the first radio base station; and (3) repeating reception of at least one frame from other radio base stations and the rest of the frames from the first radio base station until reception of reception elecric fields from other radio base stations has been completed.

Also, in the steps described above, the step of, executing channel re-connection operation intermittently with the second radio base station during communication with the first radio base station, further comprises the following steps:

(1) using at least one frame of the time division multiplex access frames for executing a channel re-connection operation with the second radio base station;

(2) using the rest of the frames of the time division multiplex access frames for communicating with the first radio base station; and (3) repeating reception of at least one frame from the second radio base station and the rest of the frames from the first radio base station until execution of the channel re-connection operation with the second radio base station has been completed.

For controlling frame timing, the present invention further comprises the following steps:

(1) maintaining frame timing of the time division multiplex access frame used for communication with the first radio base station when at least one frame is used for communication with other radio base stations including the second radio base station;

(2) maintaining frame timing of the time division multiplex access frame used for communication with other radio base stations including the second radio base station when the rest of frames are used for communication with the first radio base station;

(3) switching those maintained frame timings alternatively for using suitable frame timing being communicating with radio base station.

DETAILED DESCRIPTION OF THE PREFERRED EMBODIMENTS

Embodiments of the present invention will now be explained in detail with reference to the attached drawings.

Figure 1:
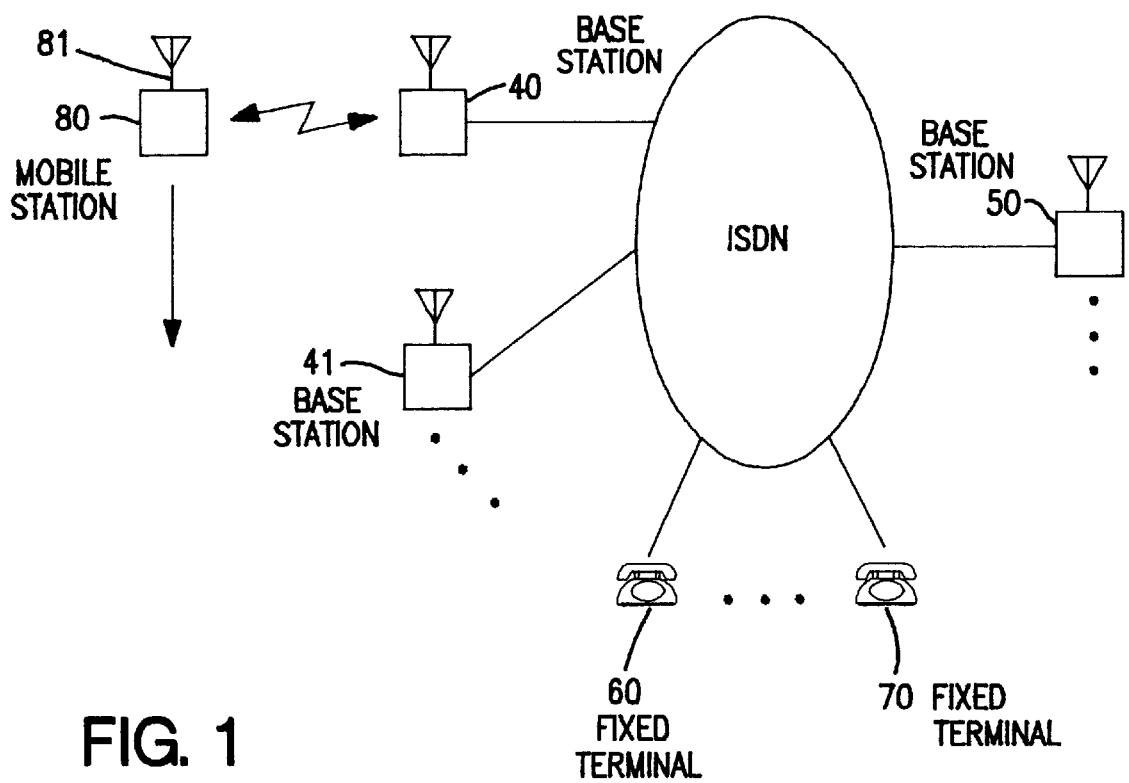
FIG. 1 is a general schematic view which shows a mobile communication system utilizing a time division duplex communications system according to an embodiment of the present invention.

FIG. 1 is a general schematic view which shows a mobile communication system (e. g., PHS: Personal Handy-phone System) utilizing a time division duplex communications system according to an embodiment of the present invention.

Figure 2:
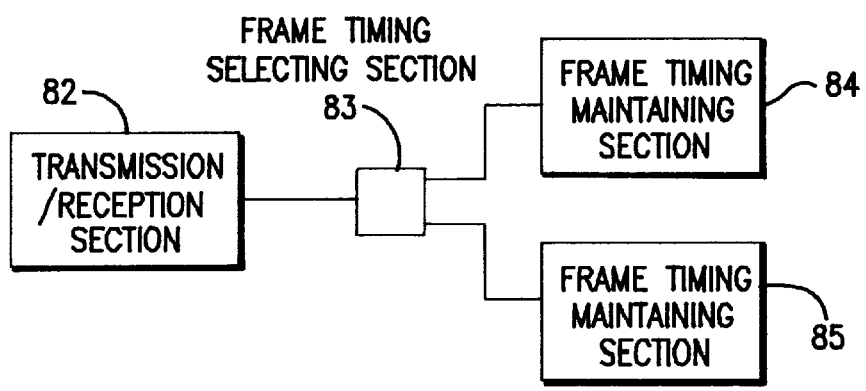
FIG. 2 is a block diagram illustrative of the configuration of the main portion of a mobile station according to the present invention.

In this drawing, a plurality of fixed terminals 60–70 and a plurality of radio base stations 40, 41, . . . and 50 are connected to a public switched telephone network (typically ISDN) 30. The respective radio base stations 40–50 provide radio communication areas in which a mobile station 80 is capable of communicating with the respective radio base stations 40–50. The mobile station 80 is equipped with an antenna 81, and, as shown in FIG. 2, the mobile station 80 is further provided with a transmission/reception section 82, a frame timing-selecting section 83, and frame timing-maintaining sections 84 and 85, which will be explained later, and can communicate with a designated fixed terminal from among the fixed terminals 60–70 via a designated radio base station from among the radio base stations 40–50.

A time division duplex communications system is used for the communication between the mobile station 80 and the radio base stations 40–50, with the same radio frequency set for transmission and reception.

Figure 3:
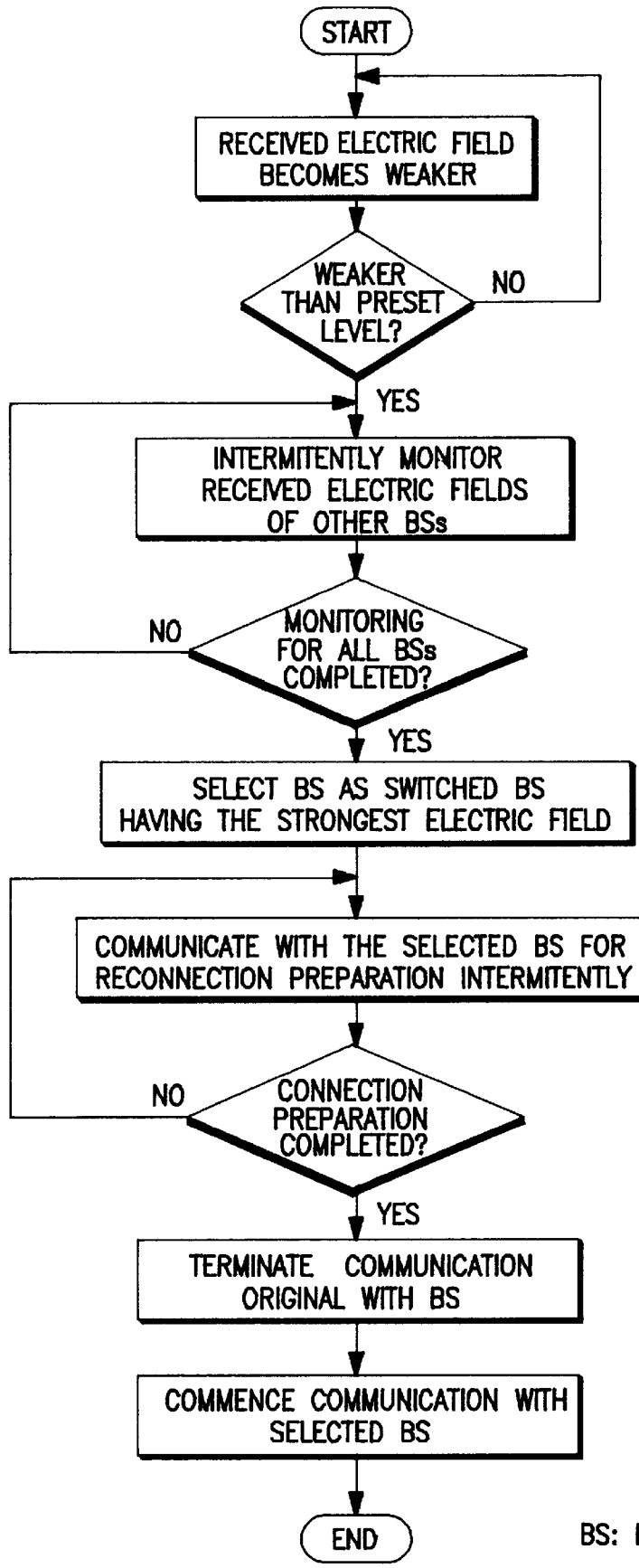
FIG. 3 is a flowchart showing overall operation of the present invention.

FIG. 3 is a flowchart showing overall operation of the present invention.

With the configuration mentioned above, while the mobile station 80 is communicating with the fixed terminal 60 connected to the public switched telephone network 30 via the radio base station 40, the mobile station 80 monitors the reception electric field from the radio base station 40 at all times during communication. The mobile station 80 detects weakening of the reception electric field from the radio base station 40 as the mobile station 80 moves away from the radio base satation 40, for example. When the reception electric field weakens beyond a certain level which is predetermined and preset in the mobile station, thereby indicating that further communication with the radio base station is difficult (steps 100 and 101 of FIG. 3), mobile station 80 receives the reception electric fields from the other nearby radio base stations 41–50 during communication with the radio base station 40 to find a suitable radio base station for the radio channel to be switched to by the strength of reception electric fields (step 102 of FIG. 3).

Figure 4:
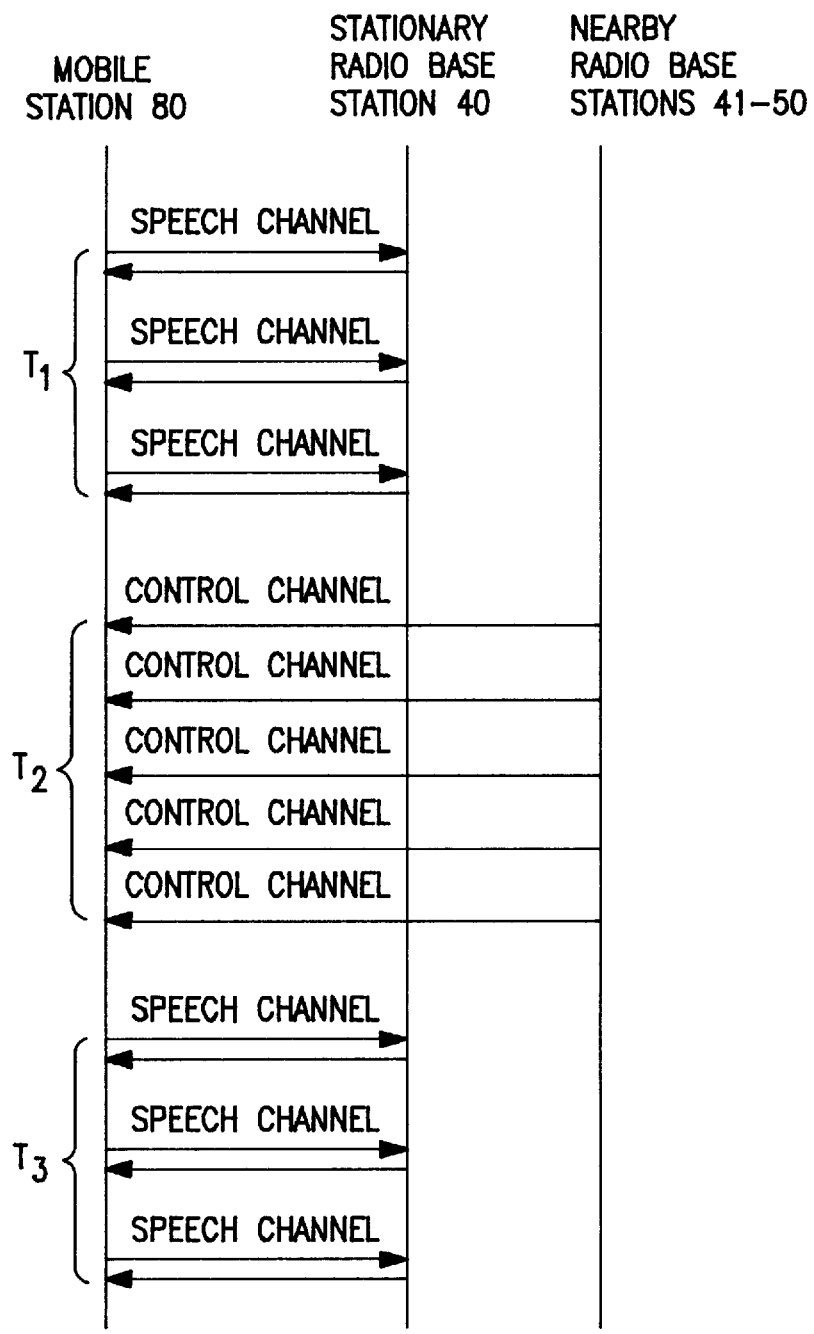
FIG. 4 is a timing chart illustrative of a method of monitoring electric fields by a mobile station according to the present invention.

More specifically, as shown in FIG. 4, TDMA speech channel frames are transmitted and received between the mobile station 80 and the radio base station 40 during time $T_1$ of the communication. Here, the mobile station 80 is designed so that the frame timing of the TDMA frame transmitted to and received from the radio base station 40 is maintained by the frame timing-maintaining section 84 via the frame timing-selecting section 83, and this frame timing is used to established the transmission/reception timing of frames of its own station.

Then, during time $T_2$ of the communication with radio base station 40, the mobile station 80 temporarily disconnects communication with the radio base station 40 at a rate of one TDMA frame per a plurality of TDMA frames, and receives a TDMA frame of reception electric fields from the other nearby radio base stations 41–50. Here, the mobile station 80 operates the frame timing-selecting section 83 to switch the frame timing-maintaining section from the frame timing-maintaining section 84 to the frame timing-maintaining section 85, and irrespective of the frame timing maintained in the frame timing-maintaining section 84, receives only control channels from the nearby radio base stations 41–50, and maintains the frame timing corresponding to the received control channel into the frame timing-maintaining section 85.

During time $T_3$ after the period of monitoring of the reception electric fields from the nearby radio base stations 41–50, the mobile station 80 resumes communication with the radio base station 40. Here, the frame timing-selecting section 83 is switched to connect the frame timing-maintaining section 84 to the transmission/reception section 82. Therefore, the mobile station 80 can be resynchronized with the radio base station 40 according to the transmission/reception timing of frames which is maintained by the frame timing-maintaining section 84.

After times $T_1$ through $T_3$ have passed, the mobile station 80 repeats the same operations, i.e. storing the reception electric fields of the control channels from the nearby radio base stations 41–50 during time $T_2$ and subsequently resuming communication with the radio base station 40.

After these operations have been repeated, a selection is made of a radio base station from which the most suitable reception electric field has been received, and thus to which the radio channel is to be switched; for example, the radio base station 41 which provides the strongest reception electric field is selected as the radio base station to be switched to (steps 103 and 104 of FIG. 3). Here, the frame timing of the switched radio base station 41 is maintained by the frame timing-maintaining section 84.

As described above, the mobile station 80 intermittently receives the reception electric fields from the other radio base stations 41–50 in cases where the reception electric field from the radio base section 40 weakens beyond a preset level, and the radio base station 41 which provides the strongest reception electric field is selected as the radio base station with which mobile station 80 communicates. Therefore, the communication from the radio base station 40 to the mobile station 80 is disconnected only during time $T_2$ during which the mobile station 80 receives the control channels from the other radio base stations 41–50 in order to determine the next suitable radio base station 41, and the communication from the mobile station 80 to the radio base station 40 is not disconnected.

An explanation will now be made regarding operations at the mobile station 80 for selecting the radio base station 41 as the next suitable radio base station and for re-connection of the speech path with the radio base station 41.

Figure 5:
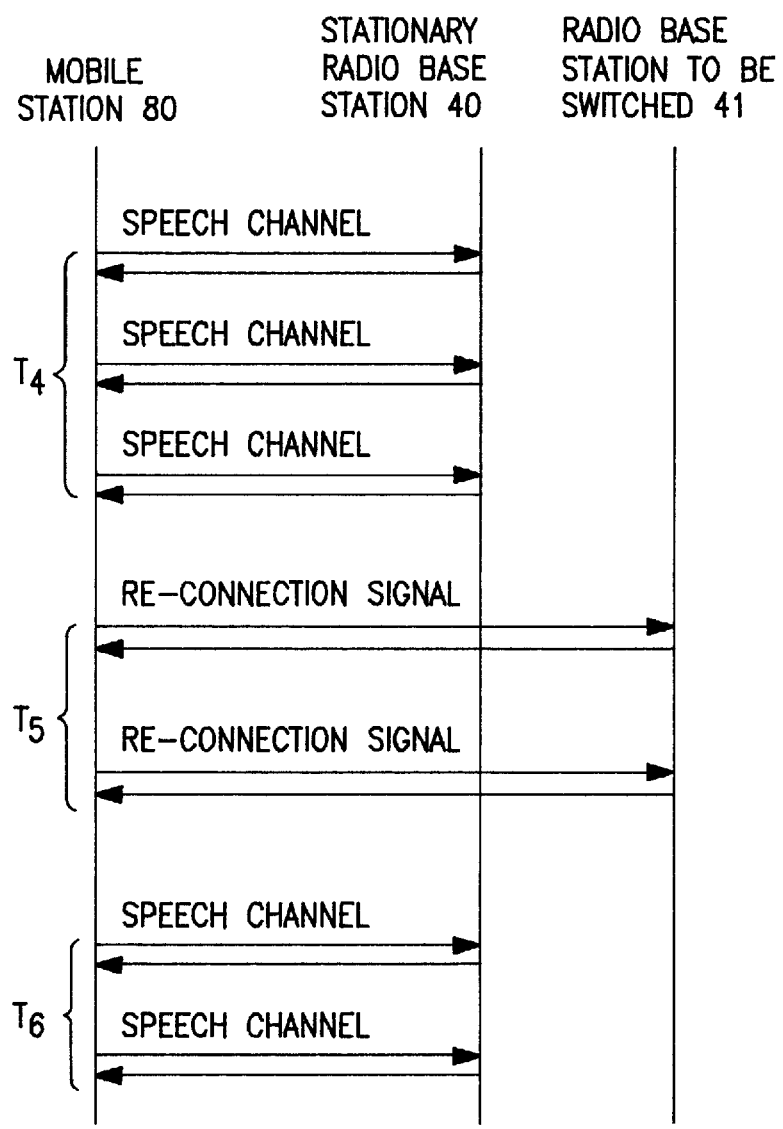
FIG. 5 is a timing chart illustrative of operations for channel re-connection between a mobile station and a switched radio base station according to the present invention.

First, as shown in FIG. 5, during time $T_4$, the mobile station 80 communicates with the radio base station 40 in synchronization therewith according to the frame timing of the TDMA frame which is maintained in the frame timing-maintaining section 84.

Then, during time $T_5$, the mobile station 80 temporarily disconnects communication with the radio base station 40, and executes operations for preparing re-connection of the speech path (i.e. channel re-connection) with the selected radio base station 41 (step 105 of FIG. 3). Here, the mobile station 80, based on the selecting operation of the frame timing-selecting section 83, executes the channel re-connection operations according to the frame timing (frame timing of the radio base station 41) maintained by the frame timing-maintaining section 85, in synchronization with the radio base station 41.

During $T_6$ after time $T_5$ has passed, the mobile station 80 again operates the frame timing-selecting section 83 for switching from the frame timing-maintaining section 85 to the frame timing-maintaining section 84, and resumes communication with the radio base station 40 according to the frame timing maintained by the frame timing-maintaining section 84.

The mobile station 80 repeats the operations for times $T_4$ through $T_6$, and terminates communication with the radio base station 40 to communicate only with the switched radio base station 41 when all the operations for re-connection with the switched radio base station 41 have been completed (steps 106, 107 and 108 of FIG. 3). The operation of switching the radio channel is completed by following the preceding operations.

The communication between the mobile station 80 and the radio base station 40 is disconnected only during the time when the mobile station 80 is communicating with the switched radio base station 41 for preparation of connection switching from the radio base station 40 to the radio base station 41.

According to the embodiment explained above, the disconnection time of communication can be reduced even if the radio channel is switched during communication, since it is designed such that, for switching the radio channel to the radio base station 41 during communication with the radio base station 40, the mobile station 80 intermittently receives the reception electric fields from the other radio base stations 41–50 while continuing operations for communication with the radio base station 40, selects the radio base station 41 to be switched to based on the reception electric fields and intermittently executes preparation operations for channel re-connection with the selected, switched radio base station 41, and the communication with the radio base station 40 is terminated under conditions that the preparation of channel re-connection operations have been completed.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A handover method for a mobile communications system that includes a plurality of radio base stations connected to a public switched telephone network and that use a time division duplex communication system for communicating with a mobile station, wherein the mobile station is equipped with only one radio transmitter/receiver that is switchably coupled to one of first and second frame timing maintaining sections for maintaining frame timing of received radio signals, the method comprising steps of:

detecting at the mobile station that the strength of an electric field transmitted from a first radio base station with which the mobile station is communicating has reached a predetermined level for initiating a handover operation;

switching connection of the transmitter/receiver from the first frame timing maintaining section to the second frame timing maintaining section while maintaining a frame timing of a radio signal used for communicating with the first radio base station in the first frame timing maintaining section;

synchronizing with a new frame timing of a further radio signal transmitted by one of adjacent radio base stations other than the first radio base station, and keeping the new frame timing in the second frame timing maintaining section;

monitoring the strength of the electric field of the further radio signal being synchronized;

switching connection of the transmitter/receiver from the second frame timing maintaining section to the first frame timing maintaining section for resuming communication with the first radio base station within a time period that will not disconnect the communication between the mobile station and the first radio base station;

repeating the monitoring step with radio signals of other adjacent radio base stations one by one, and resuming communication with the first radio base station by switching connection between the first and second frame timing maintaining sections; and selecting a second radio base station that has the strongest received electric field from among the monitored radio base stations for the handover operation, frame timing of the second radio base station being kept in the second frame timing maintaining section.

2. A handover method for a mobile communications system that includes a plurality of radio base stations connected to a public switched telephone network and that use a time division duplex communication system for communicating with a mobile station, wherein the mobile station is equipped with only one radio transmitter/receiver that is switchably coupled to one of first and second frame timing maintaining sections for maintaining frame timing of received radio signals, the method comprising steps of:

selecting a second radio base station, as a target radio base station for the handover operation, the radio base station that has the strongest received electric field from among adjacent radio base stations other than a first radio base station when a strength of the electric field received from the first radio base station has reached a predetermined level for initiating a handover operation;

keeping a frame timing of a radio signal for communicating with the second radio base station in the second frame timing maintaining section;

switching connection of the transmitter/receiver from the first framing timing maintaining section to the second frame timing maintaining section;

synchronizing with frame timing of the radio signal transmitted by the second radio base station using the second frame timing maintaining section;

communicating with the second radio base station to request and prepare for the handover operation;

switching connection of the transmitter/receiver back from the second frame timing maintaining section to the first frame timing maintaining section to resume communication with the first radio base station, within a time period that will not disconnect the communication between the mobile station and the first radio base station;

repeating the steps of communicating with the second radio base station and resuming communication with the first radio base station by switching between the first and second frame timing maintaining sections until preparation for the handover operation is completed; and carrying out the handover operation to the second radio base station.

* * * * *